United States Patent
McGusty et al.

[15] 3,676,554
[45] July 11, 1972

[54] ANTI-ARTHRITIC COMPOSITIONS COMPRISING PHOSPHINE OR PHOSPHITE GOLD HALIDE COMPLEXES AND METHODS OF PRODUCING ANTI-ARTHRITIC ACTIVITY

[72] Inventors: Elizabeth R. McGusty, Philadelphia; Blaine M. Sutton, Hatboro; Donald T. Walz, Drexel Hill, all of Pa.

[73] Assignee: Smith Kline & French Laboratories, Philadelphia, Pa.

[22] Filed: Oct. 30, 1970

[21] Appl. No.: 85,694

Related U.S. Application Data

[63] Continuation-in-part of Ser. No. 884,709, Dec. 12, 1969, abandoned.

[52] U.S. Cl. .............................................. 424/198, 260/430
[51] Int. Cl. ....................................................... A61k 27/00

[58] Field of Search ................................ 424/198; 260/430

[56] References Cited

UNITED STATES PATENTS 2,451,841  10/1940  Lewenstein ........................... 260/430
2,607,789  10/1952  Weiss .................................... 260/430

OTHER PUBLICATIONS

Chem. & Engineering News, Aug. 12, 1968, pp. 46–53.
Mann et al., J. Chem. Soc. pp. 1235– 1239(1940).

*Primary Examiner*—Stanley J. Friedman
*Attorney*—William H. Edgerton, Richard D. Foggio, Joan S. Keps, Alan D. Lourie and Joseph A. Marlino

[57] ABSTRACT

Pharmaceutical compositions having anti-arthritic activity comprising a phosphine or phosphite gold halide complex and methods of producing anti-arthritic activity by administering internally, preferably orally, said compositions.

10 Claims, No Drawings

ANTI-ARTHRITIC COMPOSITIONS COMPRISING PHOSPHINE OR PHOSPHITE GOLD HALIDE COMPLEXES AND METHODS OF PRODUCING ANTI-ARTHRITIC ACTIVITY

This application is a continuation-in-part of application Ser. No. 884,709 filed Dec. 12, 1969, now abandoned.

This invention relates to novel pharmaceutical compositions having anti-arthritic activity and to methods of producing anti-arthritic activity by administering said compositions. More specifically the compositions of this invention comprise a phosphine or phosphite gold halide complex as the active medicament.

Gold salts have been known for many years to have anti-arthritic activity. However, their utility is limited by the requirement that they be administered only by the parenteral route and the frequent occurrence of limiting side effects. The compositions of this invention have distinct advantages in that they are active, particularly when administered by the oral route, with a reduced incidence of undesirable side effects.

The novel pharmaceutical compositions of this invention, in dosage unit form, comprise a nontoxic pharmaceutical carrier and a phosphine or phosphite gold halide complex represented generally by the following structural formula:

$$R_3P \rightarrow AuX$$

FORMULA I wherein:
R represents lower alkyl, phenyl, lower alkoxy or phenoxy, with the lower alkyl and lower alkoxy moieties being straight or branched chain, of from one to three carbon atoms; and
X represents chloro, bromo or iodo, preferably chloro.

The compounds of formula I above are either known or are prepared by methods known in the literature. For example, a solution of thiodiglycol in a nonreactive organic solvent is mixed with an aqueous solution of gold acid chloride trihydrate, cooled to a temperature of from −10° to −5° C. and then the solution is reacted with an appropriate phosphine or phosphite to give the corresponding phosphine or phosphite gold chlorides. Reference may be made also to J. Chem. Soc., 1828 (1937) and 1235 (1940); Australian J. Chem., 19, 547 (1966).

The anti-arthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses of 1.5 mg. to 10 mg. (calculated on gold content) per kilogram of body weight. Adjuvant arthritis in rats is produced by a single injection of 0.75 mg. of Mycobacterium butyricum suspended in white paraffin (N.F.) into a hindpaw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of formula I administered in the doses described above beginning on the day of adjuvant injection and continuing for 17 days, thereafter, exclusive of days 4, 5, 11, and 12 protect the animals against development of both primary and secondary lesions of adjuvant arthritis.

The pharmaceutical compositions of this invention are prepared in conventional dosage unit forms by incorporating an amount of a compound of Formula I sufficient to produce anti-arthritic activity, without limiting side effects, with a non-toxic pharmaceutical carrier according to accepted procedures. Preferably the compositions will contain a phosphine or phosphite gold halide complex of Formula I in an amount of from about 1 mg. to about 5 mg., calculated on gold content, per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method in accordance with this invention comprises administering internally to an animal organism phosphine or phosphite gold halide complex of Formula I above, usually combined with a pharmaceutical carrier, in an amount sufficient to produce anti-arthritic activity without limiting side effects. The active medicament will be administered in a dosage unit, preferably in an amount of from about 1 mg. to about 5 mg., calculated on gold content. The route of administration may be orally or parenterally, the oral route being preferred. Advantageously equal doses will be administered one or two times daily with the daily dosage regimen being from about 1 mg. to about 10 mg., calculated on gold content. When the method described above is carried out anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of Formula I and their incorporation into pharmaceutical compositions of this invention, and as such are not to be considered as limiting the invention set forth in the claims appended hereto.

EXAMPLE 1

Triethylphosphinegold chloride

A solution of 10.0 g. (0.08 mole) of thiodiglycol in 25 ml. of ethanol is mixed with a solution of 15.76 g. (0.04 mole) of gold acid chloride trihydrate in 75 ml. of distilled water. When the bright orange-yellow solution is almost colorless, it is cooled to below −5° C. and an equally cold solution of 5.0 g. (0.0425 mole) of triethylphosphine in 25 ml. of ethanol is added dropwise to the stirred solution. After the addition is complete, the cooled mixture is stirred for one-half hour. Solid that separates is removed and the filtrate is concentrated to about 30 ml. to yield a second crop. The combined solid is washed with aqueous-ethanol (2:1) and recrystallized from ethanol by adding water to the cloud point. The product is obtained as white needles, m.p. 85°–86° C.

EXAMPLE 2

Triisopropylphosphinegold chloride

A mixture of 11.82 g. (0.03 mole) of gold acid chloride trihydrate and 7.9 g. (0.065 mole) of thiodiglycol in 100 ml. of aqueous ethanol (3:2) is stirred until the color of auric gold disappears. The almost colorless solution is cooled below −5° C. and an equally cold solution of 5.6 g. (0.035 mole) of triisopropylphosphine in 20 ml. of ethanol is added dropwise. The volume of the final reaction mixture is increased to 250 ml. with aqueous ethanol (1:1) in order to maintain a fluid mixture. After the addition is complete, the mixture is stirred in the cold for 45 minutes. The solid is removed by filtration, washed first with alcohol-water (1–2) then with water and dried. It is redissolved by suspending in ethanol and adding sufficient methylene chloride for solution. The cloudy solution is filtered from suspended gold and the filtrate concentrated until crystallization. There is obtained white crystals, m.p. 184°–6 C.

EXAMPLE 3

Trimethylphosphinegold chloride

A solution of 2.44 g. (0.02 mole) of thiodiglycol in 15 ml. of methanol is mixed with a solution of 3.98 g. (0.01 mole) of gold acid chloride trihydrate in 25 ml. distilled water. When the orange-yellow solution becomes almost colorless, it is cooled to −15° C. and an equally cold solution of 760 mg. (0.01 mole) of trimethylphosphine in 10 ml. of methanol is added dropwise to the stirred solution. After the addition, the cooled mixture is stirred for one-half hour. The product is filtered off and the filtrate concentrated under reduced pressure to yield a second crop. The combined product is washed with cold aqueous methanol (2:1) and water, m.p. 228°–229° C.

EXAMPLE 4

By following procedures outlined in J. Chem. Soc. 1828 (1937) trialkylphosphinegold iodide complexes are prepared, for example triethylphosphinegold iodide. Similarly, by following procedures outlined in J. Chem. Soc., 1235 (1940) trialkylphosphinegold bromides are prepared, for example triethylphosphinegold bromide and trimethylphosphinegold bromide.

EXAMPLE 5

| Ingredients | Mg./Tablet |
| --- | --- |
| Triethylphosphinegold chloride | 5 |
| Calcium sulfate, dihydrate | 150 |
| Sucrose | 25 |
| Starch | 15 |
| Talc | 5 |
| Stearic acid | 3 |

The sucrose, calcium sulfate and triethylphosphinegold chloride are thoroughly mixed and granulated with hot 10 percent gelatin solution. The wetted mass is passed through a No. 6 mesh screen directly onto drying trays. The granules are dried at 120° F. and passed through a No. 20 mesh screen, mixed with the starch, talc and stearic acid, and compressed into tablets.

EXAMPLE 6

| Ingredients | Mg./Capsule |
| --- | --- |
| Triethylphosphinegold chloride | 1 |
| Magnesium stearate | 5 |
| Lactose | 400 |

The above ingredients are screened through a No. 40 mesh screen, mixed and filled into No. 0 hard gelatin capsules.

EXAMPLE 7

Trimethylphosphitegold chloride

Gold acid chloride trihydrate (4.0 g.) is reduced to aurous chloride with 2.44 g. of thiodiglycol in aqueous-methanol (1:2) solution. The resulting solution is cooled to below −5° C. and an equally cold solution of 1.5 g. of trimethylphosphite in 10 ml. of methanol is added dropwise, with stirring under nitrogen. The reaction mixture is stirred for 30 minutes, filtered and the solid is washed with cold aqueous methanol and dried. The product is dissolved in 5 ml. of chloroform, diluted with 10 ml. of methanol and filtered through charcoal. The filtrate is concentrated under reduced pressure, cooled and diluted with ice-water to precipitate the product, m.p. 99°–100b$L$ C.

EXAMPLE 8

Triethylphosphitegold chloride

Gold acid chloride trihydrate (5.9 g., 0.015 m.) is reduced to aurous chloride with thiodiglycol (3.7 g., 0.03 m.) in aqueous ethanol (1:2) solution. The solution is cooled to −10° C. and an equally cold solution of 3.72 g. (0.02 m.) of triethylphosphite in 20 ml. of ethanol is added, dropwise with stirring. The temperature is maintained at −10° C. and stirring is continued for 30 minutes. The ethanol is removed from the reaction mixture under reduced pressure without heating. The aqueous residue is extracted with methylene chloride and the dried extract is evaporated under reduced pressure. The crude product is purified by chromatography over a silica column to give an oil.

EXAMPLE 9

Triphenylphosphinegold chloride

Gold acid chloride trihydrate (4.0 g., 0.01 m.) is reduced to aurous chloride with thiodiglycol in 1:2 aqueous ethanol. After cooling this solution in an ice-bath, a cold solution of 2.62 g. (0.01 m.) of triphenylphosphine in a minimum amount of ethanol is added with stirring. The reaction mixture is stirred for about 30 minutes, filtered and the product washed with cold aqueous alcohol, then ice-water and dried, m.p. 242°–243° C.

What is claimed is:

1. A pharmaceutical composition having anti-arthritic activity, in dosage unit form for oral administration, comprising a pharmaceutical carrier and an effective, nontoxic amount of a phosphine or phosphite gold halide complex of the formula:

$$R_3P \rightarrow AuX$$

in which:
R is lower alkyl, phenyl, lower alkoxy or phenoxy, said lower alkyl and lower alkoxy being straight or branched chain, of from one to three carbon atoms; and
X is chloro, bromo or iodo.

2. A pharmaceutical composition according to claim 1 in which X is chloro.

3. A pharmaceutical composition according to claim 2 in which R is lower alkyl.

4. A pharmaceutical composition according to claim 3 in which R is ethyl.

5. A pharmaceutical composition according to claim 4 in which the amount of the active medicament is from about 1 mg. to about 5 mg., calculated on gold content.

6. The method of producing anti-arthritic activity which comprises administering orally to an animal organism in an amount sufficient to produce said activity without limiting side effects a phosphine or phosphite gold halide complex of the formula:

$$R_3P \rightarrow AuX$$

in which:
R is lower alkyl, phenyl, lower alkoxy or phenoxy, said lower alkyl and lower alkoxy being straight or branched chain, of from one to three carbon atoms; and
X is chloro, bromo or iodo.

7. The method according to claim 6 in which X is chloro.

8. The method according to claim 7 in which R is lower alkyl.

9. The method according to claim 8 in which R is ethyl.

10. The method according to claim 9 in which the active medicament is administered in a daily dosage regimen of from about 1 mg. to about 10 mg., calculated on gold content.

* * * * *